July 11, 1950 — E. L. ROOFE — 2,514,417
SWIVEL JOINT
Filed Jan. 12, 1946
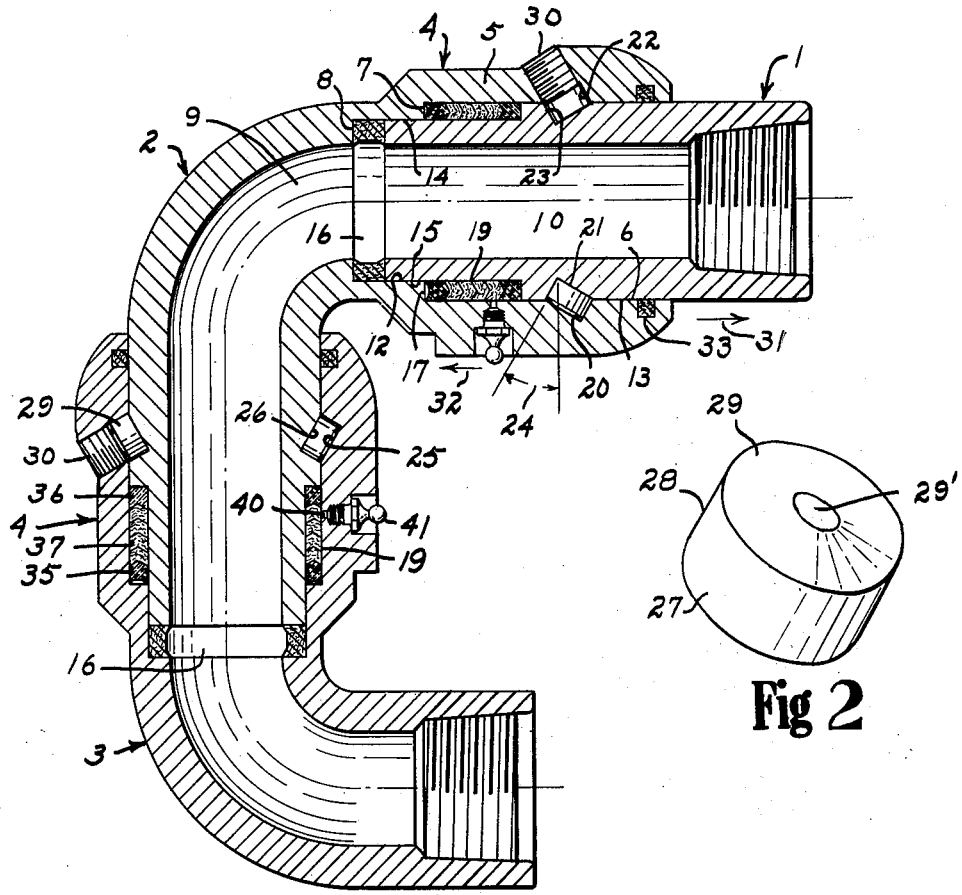
Fig 1
Fig 2
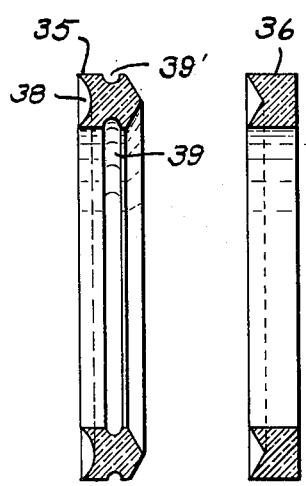
Fig 3
ELMER L. ROOFE
INVENTOR.
By Lester B. Clark
Ray L. Smith
ATTORNEYS.

Patented July 11, 1950

2,514,417

UNITED STATES PATENT OFFICE 2,514,417

SWIVEL JOINT

Elmer L. Roofe, Houston, Tex.

Application January 12, 1946, Serial No. 640,850

5 Claims. (Cl. 285—97.3)

This invention relates to a swivel joint for conduits, and more particularly to a joint of this type that is capable of effectively resisting leakage under all internal pressures and which will at the same time permit desired swivel action.

It is a general object of the invention to provide a swivel joint that is simple to construct, easy to maintain, and that will function efficiently and effectively over a long period of time in normal use.

Another object is to provide a swivel connection of the class described having a novel packing arrangement that will assure adequate lubrication of the relatively movable parts and will at the same time assure a seal against leakage through the joint.

A further object is to provide a swivel joint including packing of the chevron type within the joint, a pressure lubricant passage being provided proximate the outer end of the packing so that lubricant is supplied in opposite directions to all portions of the joint.

Still another object is to provide a swivel joint comprising interfitting male and female members having a novel antifriction bearing therebetween, such bearing cooperating with the packing arrangement to provide desired operating characteristics and comprising an annulus of disk bearing members having diametral opposite portions of their cylindrical surfaces engaging opposed complemental surfaces on the interfitting members.

The foregoing objects together with other objects and advantages of the invention will be more fully apparent from the following description considered in connection with the accompanying drawings in which:

Fig. 1 is a sectional view through a swivel joint embodying one form of the invention;

Fig. 2 is a perspective view of one of the elements used in providing an antifriction bearing between parts of the joint;

Fig. 3 comprises enlarged vertical sectional views through the male and female adapters of the chevron type packing assembly used as one element of the joint.

The invention as shown in Fig. 1 of the drawings comprehends a swivel joint comprising sections 1, 2 and 3, there being a swivel joint 4 between succeeding sections. The outermost sections 1 and 3 may comprise elongated conduit or pipe sections or may, as shown, be threaded internally for connection to sections of pipe or hose as desired.

A single joint 4 is used where a through swivel connection is desired between succeeding conduits or where a limited range of directional freedom is required. If, on the other hand, a greater freedom of movement or universal movement is desired, a plurality of swivelly interconnected sections are used; as for example, the construction shown in Fig. 1. Inasmuch as the connections 4 are preferably identical and the sections 1, 2 and 3 may be of any selected shape, it is to be understood that reference to structural details is applicable to either of the connections shown.

Referring specifically to the connection 4 between sections 1 and 2, it is to be noted that the end of the latter comprises a female member 5 having stepped counterbore 6 providing spaced outwardly facing shoulders 7 and 8 of which the latter terminates in the passage 9 within the conduit section 2 of a common diameter with the passage 10 in the conduit section 1.

The section 1 comprises a male member and is reduced peripherally at its inner end so that the reduced end fits within the inner portion 14 of the counterbore 6 to provide an inner bearing area 15. Outwardly from this area the reduced end cooperates with the larger bore of the section 1 to form a packing chamber 17.

The reduced end 15 is opposed to the shoulder 8 thereby forming a groove which receives an abrasion resistant filler ring 16 preferably of rubber or of other material having such characteristics that it effectively resists the tendency for abrasion at the juncture of sections 1 and 2 by abrasive fluids passing through the swivel joint. Not only does this ring serve the function just indicated, but it also serves as an inner barrier against the entry of abrasive material to lubricant which, as will be more fully explained, is entrapped inwardly from the chamber 17 which encloses the packing 19. This packing in turn forms a seal which assures that leakage through the swivel joint cannot occur and also that adequate lubrication of the inner portion of the joint, and the packing, shall be provided.

An important feature of the invention resides in means for accurately holding the sections 1 and 2 in the proper relative position regardless of the fluid pressure within the joint. Such means must also be capable of permitting desired swivel action between the sections. To this end and in addition to the structure already described, there is provided on the inner periphery of the female member 5 and on the outer periphery of the male member 1, a pair of opposed grooves 20 and 21. These grooves have opposed parallel bearing surfaces 22 and 23 which are congruent truncated conical surfaces inclined to a plane normal to the axis of the joint at an angle indicated at 24. For best results, providing free movement between parts of the joint, and yet avoiding excessive concentrated stresses in the materials thereof, the angle 24 is preferably approximately 30° although such parameter is suggested by way of illustration and not of limitation.

The bottoms 25 and 26 of the grooves 20 and 21 are likewise parallel surfaces. The dimensions of the composite groove formed by these surfaces are such that the cylindrical surface 27 of the rollers 28 in the groove makes rolling contact with the bearing surfaces 22 and 23.

It might be said that each groove is a triangle whose base at 22 or 23 is the base of the triangle and the hypotenuse lies along the cylindrical peripheral surface of the members. The roller bearing surface 22 or 23 of each groove applies the thrust to the roller bearings. It will thus be seen as in Fig. 1 that the two triangular grooves create a rectangular roller bearing space. The internal fluid pressure sets up an axial thrust on the male and female members which in turn places the roller bearing members in shear along a diagonal and by the thrust on the roller bearing surfaces.

The inner faces of the rollers 28 are preferably flat and are closely juxtaposed to or in engagement with the surface 26 on the male member. The outer faces 29 are, however, slightly tapered and terminate outwardly in a flat circular surface 29' for engagement with the inner surface 25 of the female member. This construction provides free rolling action of the rollers 29 within the composite groove whereby the joint is capable of relative movement of parts even under extreme pressures which are desirably distributed through the structure so that possibility of failure of any part of the device is minimized.

Outwardly from the composite groove along the joint there is provided a seal ring 33 to assist in the retention of lubricant within the joint.

It seems apparent that fluid pressure within the joint, as thus far described, will tend to effect separation of the members 1 and 2 as indicated by the arrows 31 and 32, but that such tendency will be resisted by the rollers 29 so that the sections 1 and 2 will be accurately retained in the relative positions shown.

The lipped ring 16 is effective to prevent cutting away of material at the inner juncture of the members 1 and 2 and to thereby maintain a constant bore 10 through the joint. At the same time this ring prevents the entrance of abrasive material to the bearing area 15.

To assure against leakage and to provide adequate lubrication, the packing 19 in the chamber 17 comprises male and female adapters 35 and 36 at opposite sides of the chevron rings 37. The effectiveness of the packing 19 is enhanced, and adequate lubrication of the joint is provided, through a passage 40 proximate the outermost ring 37, such passage being provided with a pressure fitting 41 whereby lubricant may be introduced under pressure to the packing and joint. The lubricant introduced by way of the passage 40, will of course, move outwardly to the rollers 29 and adjacent surfaces. Likewise, the lubricant will move inwardly past the packing 19 where it will serve the dual function of lubricating the parts and providing a body of lubricant that will expand the rings 37 whereby an adequate seal within the joint is maintained. The body of lubricant is increased by providing an axial groove 38 and inner and outer grooves 39 and 39' in the adapter ring 35.

In the use and operation of the swivel joint it will be assumed that initially an adequate body of lubricant is introduced through the pressure fitting 41 and the passage 40 that adequate lubrication is had and the space between the packing 19 and the filler ring 16 is filled. This condition permits relative rotation of the parts of the joint with a minimum of friction. At the same time the body of lubricant inwardly from the packing 19 supplements and backs up the filler ring 16 and in this manner contamination of the lubricant is avoided and a seal against leakage from within the joint is assured.

What is claimed is:

1. A swivel joint for conduits and the like comprising tubular interfitting male and female members, packing between said members, opposed complementary V-shaped grooves in the members outwardly of said packing, each of said grooves comprising a pair of inclined peripheral surfaces meeting at right angles in each member to provide a roller bearing recess which is rectangular in section, and one of said surfaces in each member comprising a continuous roller bearing surface at an obtuse angle to a plane normal to the axis of the members, and a plurality of cylindrical bearing members within the rectangular space formed by the said complementary grooves having their cylindrical surfaces in engagement with the opposed roller bearing surfaces.

2. A swivel joint for conduits and the like comprising tubular interfitting male and female members, packing between said members, opposed grooves having end and bottom surfaces in the members outwardly of said packing, each of said grooves in the respective members comprising a pair of intersecting frusto-conical surfaces, whereby a continuous roller bearing space of substantially rectangular cross section is formed, and a plurality of cylindrical bearing members to roll within said space on one surface of each member and forming a thrust bearing for the joint where the diagonal of the bearing is in shear.

3. A swivel joint for conduits and the like comprising tubular interfitting male and female members, packing between said members, opposed grooves in the members outwardly of said packing, each of said grooves comprising a pair of intersecting continuous frusto-conical surfaces in each of said members, whereby a bearing space of substantially rectangular cross section is formed, the opposed parallel ends of said grooves forming thrust bearing surfaces, and a plurality of cylindrical roller bearing members filling said space with the cylindrical surfaces of the bearing members in engagement with the roller bearing thrust surfaces whereby the axial thrust caused by internal fluid pressure is carried by said opposed roller bearing surfaces with a diagonal of said bearing members placed in shear.

4. A swivel joint for conduits and the like comprising tubular interfitting male and female members, packing between said members, opposed complementary grooves in the members outwardly of said packing, each of said grooves comprising a triangle whose hypotenuse lies along the periphery of its member whereby the opposed grooves form an annular bearing space of substantially rectangular cross section, and a plurality of cylindrical bearing members in said space, the cylindrical surfaces of the bearing members roll on the base of the triangular groove in each member whereby the interfitting members are held in assembled relation and the axial thrust of the members is resisted by shear along a diagonal of the bearing members.

5. A swivel joint for coupling pipe comprising a female member, a male member co-axially disposed therein, packing to seal between said members, a roller bearing construction arranged disposed between said members to absorb axial thrust due to high internal fluid pressure in the pipe and members, said construction comprising a triangular roller bearing surface in each member to abut a roller bearing to transmit the thrust on that member to the roller surface of such roller bearing, said triangles being reversely disposed in the respective members to provide a rectangular roller bearing space whose diagonal lies along the cylindrical plane between said members, a plurality of cylindrical roller bearing disposed in such rectangular space so that such roller bearings each have a diagonal thereof in shear due to the thrust on said members.

ELMER L. ROOFE.

REFERENCES CITED

The following references are of record in the file of this patent:

UNITED STATES PATENTS

| Number | Name | Date |
|---|---|---|
| 409,216 | Magee | Aug. 20, 1889 |
| 1,153,824 | Pierce | Sept. 14, 1915 |
| 2,092,116 | Hansen | Sept. 7, 1937 |
| 2,269,431 | Allen et al. | Jan. 13, 1942 |
| 2,312,341 | King | Mar. 2, 1943 |
| 2,322,679 | Williamson | June 22, 1943 |